(12) United States Patent
Zhang

(10) Patent No.: US 12,172,550 B2
(45) Date of Patent: Dec. 24, 2024

(54) HAPTIC FEEDBACK CONTROL METHOD, HAPTIC FEEDBACK CONTROL DEVICE, AND STORAGE MEDIUM

(71) Applicants: Beijing BOE Technology Development Co., Ltd., Beijing (CN); BOE Technology Group Co., Ltd., Beijing (CN)

(72) Inventor: Hengfei Zhang, Beijing (CN)

(73) Assignees: Beijing BOE Technology Development Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 18/005,828

(22) PCT Filed: Feb. 28, 2022

(86) PCT No.: PCT/CN2022/078420
§ 371 (c)(1),
(2) Date: Jan. 17, 2023

(87) PCT Pub. No.: WO2023/159606
PCT Pub. Date: Aug. 31, 2023

(65) Prior Publication Data
US 2024/0246456 A1  Jul. 25, 2024

(51) Int. Cl.
*B60N 2/02* (2006.01)
*G06F 3/01* (2006.01)
(Continued)

(52) U.S. Cl.
CPC ......... *B60N 2/0233* (2023.08); *B60N 2/0248* (2013.01); *G06F 3/016* (2013.01);
(Continued)

(58) Field of Classification Search
CPC ...... B60N 2/02; B60N 2/0226; B60N 2/0233; B60N 2/0235; B60N 2/0248;
(Continued)

(56) References Cited

U.S. PATENT DOCUMENTS 4,689,537 A * 8/1987 Mizuta ................. B60N 2/0248
318/568.1
11,921,927 B1 * 3/2024 Kuker ................. G06F 3/04886
(Continued)

FOREIGN PATENT DOCUMENTS

CN    103171459 A    6/2013
CN    104943632 A    9/2015
(Continued)

*Primary Examiner* — Xuemei Zheng
(74) *Attorney, Agent, or Firm* — Workman Nydegger

(57) ABSTRACT

Provided are a haptic feedback control method, a haptic feedback control device, and a storage medium. The haptic feedback control method includes: controlling a display screen to display an adjustment information page having a touch adjustment button and a three-dimensional (3D) model of a vehicle seat upon receiving an instruction to display the page on the display screen, where the display screen has a vibration sensor; and receiving a touch instruction, on the touch adjustment button, from a user, adjusting a posture of the vehicle seat through the touch adjustment button, controlling the vibration sensor to perform haptics at a position of the touch adjustment button, and controlling the display screen to synchronously display a posture of the 3D model of the vehicle seat that is the same as that of the vehicle seat.

13 Claims, 8 Drawing Sheets

(51) Int. Cl.
*G06F 3/0481* (2022.01)
*G06F 3/0484* (2022.01)
*G06F 3/0488* (2022.01)
*G06T 19/20* (2011.01)

(52) U.S. Cl.
CPC ............ *G06F 3/0488* (2013.01); *G06T 19/20* (2013.01); *G06T 2200/24* (2013.01); *G06T 2219/2004* (2013.01)

(58) Field of Classification Search
CPC ..... B60N 2/0239; B60N 2/0284; G06F 3/016; G06F 3/0488; G06F 3/044
See application file for complete search history.

(56) References Cited

U.S. PATENT DOCUMENTS

| | | | |
|---|---|---|---|
| 2010/0036560 A1* | 2/2010 | Wright | B60R 16/037 701/36 |
| 2010/0318266 A1* | 12/2010 | Schaaf | B60K 35/10 701/49 |
| 2016/0379631 A1* | 12/2016 | Wang | B60N 2/02246 704/275 |
| 2018/0001789 A1* | 1/2018 | Cengil | B60N 2/0228 |
| 2018/0059913 A1 | 3/2018 | Penilla et al. | |
| 2018/0292903 A1 | 10/2018 | Li | |
| 2019/0212819 A1 | 7/2019 | Piao et al. | |
| 2020/0019301 A1* | 1/2020 | Kolb | G06F 3/023 |
| 2021/0070196 A1 | 3/2021 | Vincent et al. | |

FOREIGN PATENT DOCUMENTS

| | | |
|---|---|---|
| CN | 104972931 A | 10/2015 |
| CN | 105159459 A | 12/2015 |
| CN | 106354317 A | 1/2017 |
| CN | 106933418 A | 7/2017 |
| CN | 109254658 A | 1/2019 |
| CN | 109284005 A | 1/2019 |
| CN | 110001547 A | 7/2019 |
| CN | 110712576 A | 1/2020 |
| CN | 111251952 A | 6/2020 |
| CN | 112373358 A | 2/2021 |
| CN | 306469651 S | 4/2021 |
| CN | 214311373 U | 9/2021 |
| CN | 306810740 S | 9/2021 |
| CN | 113844340 A | 12/2021 |

* cited by examiner

S101 — Control a display screen to display an adjustment information page having a touch adjustment button and a three-dimensional (3D) model of a vehicle seat upon receiving an instruction to display the page on the display screen, where the display screen has a vibration sensor S102 — Receive a touch instruction, on the touch adjustment button, from a user, adjust a posture of the vehicle seat through the touch adjustment button, control the vibration sensor to perform haptics at a position of the touch adjustment button, and control the display screen to synchronously display a posture of the 3D model of the vehicle seat that is the same as that of the vehicle seat

Fig. 1

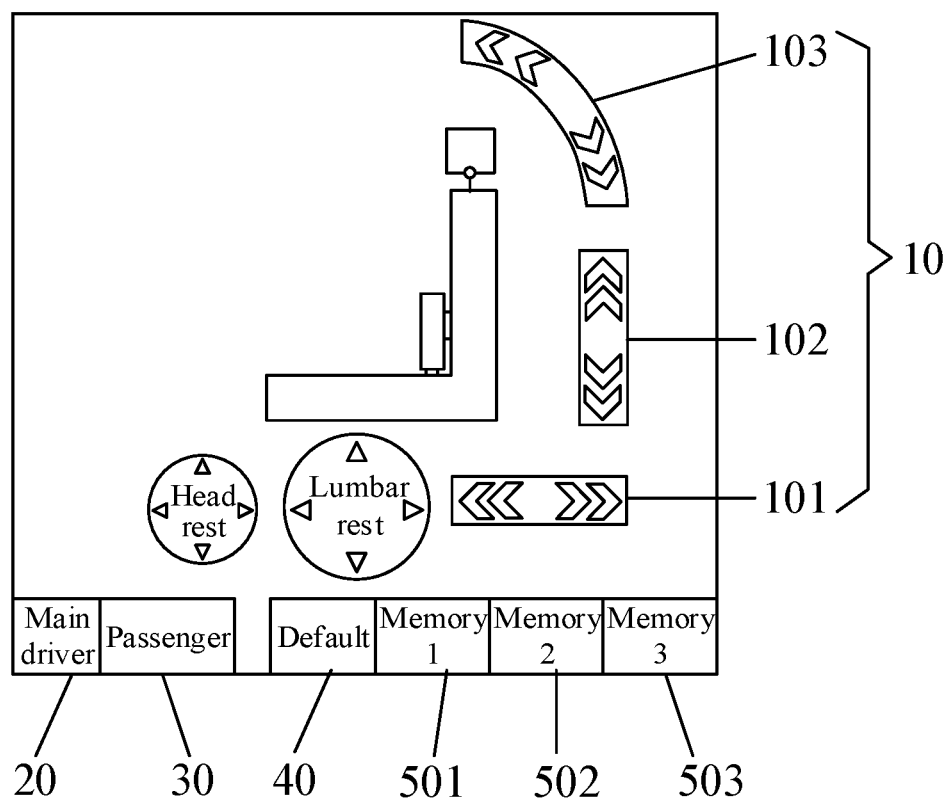

Fig. 2

HAPTIC FEEDBACK CONTROL METHOD, HAPTIC FEEDBACK CONTROL DEVICE, AND STORAGE MEDIUM

CROSS-REFERENCE TO RELATED APPLICATIONS

This application is a National Stage of International Application No. PCT/CN2022/078420, filed Feb. 28, 2022, which is hereby incorporated by reference in its entirety.

FIELD

The present disclosure relates to the field of vehicular technology, and in particular to a haptic feedback control method, a haptic feedback control device, and a storage medium.

BACKGROUND

Haptics enables interaction between a terminal and a human through the sense of touch, thereby becoming a focus of scientific and technological development at present.

SUMMARY

Embodiments of the present disclosure provide a haptic feedback control method, a haptic feedback control device, and a storage medium. Specific solutions are as follows.

An embodiment of the present disclosure provides a haptic feedback control method. The haptic feedback control method is used for adjusting a vehicle seat and includes: controlling a display screen to display an adjustment information page having a touch adjustment button and a three-dimensional (3D) model of the vehicle seat upon receiving an instruction to display the page on the display screen, where the display screen has a vibration sensor; and receiving a touch instruction, on the touch adjustment button, from a user, adjusting a posture of the vehicle seat through the touch adjustment button, controlling the vibration sensor to perform haptics at a position of the touch adjustment button, and controlling the display screen to synchronously display a posture of the 3D model of the vehicle seat that is the same as that of the vehicle seat.

In a possible embodiment, the above haptic feedback control method provided in the embodiment of the present disclosure further includes: controlling the display screen to display an adjustment information page having a touch adjustment button upon receiving an instruction to display the page on the display screen; and receiving an adjustment instruction of the vehicle seat specifically includes: receiving the touch instruction, on the touch adjustment button, from the user.

In a possible embodiment, in the above haptic feedback control method provided in the embodiment of the present disclosure, the touch adjustment button is provided with a strip-like area, and the receiving a touch instruction, on the touch adjustment button, from a user specifically includes: receiving a slide touch operation instruction, in an extension direction of the strip-like area, from the user.

In a possible embodiment, the above haptic feedback control method provided in the embodiment of the present disclosure further includes: adjusting the posture of the vehicle seat at a first speed upon receiving a slide touch operation, along a central position of the strip-like area, from the user; and adjusting the posture of the vehicle seat at a second speed upon receiving a slide touch operation, along an edge position of the strip-like area, from the user; the first speed is less than the second speed.

In a possible embodiment, in the above haptic feedback control method provided in the embodiment of the present disclosure, the touch adjustment button includes at least one the following: a front-back position adjustment button, an up-down position adjustment button, and a back rest angle adjustment button; and the adjusting the posture of the vehicle seat includes at least one of the following: adjusting a front-back position of the vehicle seat, adjusting an up-down position of the vehicle seat, and adjusting a pitch angle of a back rest of the vehicle seat.

In a possible embodiment, in the above haptic feedback control method provided in the embodiment of the present disclosure, the touch adjustment button is provided with a plurality of blocky areas indicating different directions, and the receiving a touch instruction, on the touch adjustment button, from a user specifically includes: receiving a click touch operation instruction, on the blocky area, from the user.

In a possible embodiment, in the above haptic feedback control method provided in the embodiment of the present disclosure, the touch adjustment button includes at least one the following: a lumbar rest position adjustment button and a head rest position adjustment button; and the adjusting a posture of the vehicle seat includes at least one of the following: adjusting a position of a lumbar rest of the vehicle seat and adjusting a position of a head rest of the vehicle seat.

In a possible embodiment, in the above haptic feedback control method provided in the embodiment of the present disclosure, the display screen is provided with piezoelectric devices, and after the receiving a touch instruction, on the touch adjustment button, from a user, the method further includes: controlling the piezoelectric device to perform haptics at a position of the displayed touch adjustment button.

In a possible embodiment, the above haptic feedback control method provided in the embodiment of the present disclosure further includes: controlling the display screen to display an adjustment information page having a main driver button and a passenger button upon receiving an instruction to display the page on the display screen, the main driver button or the passenger button is clicked according to demands of the user to adjust a posture of a main driver seat or a posture of a passenger seat.

In a possible embodiment, the above haptic feedback control method provided in the embodiment of the present disclosure further includes: controlling the display screen to display an adjustment information page having a default button upon receiving an instruction to display the page on the display screen; before adjusting the posture of the vehicle seat, the user clicks the default button, so that the posture of the vehicle seat is adjusted to a factory posture of the vehicle seat automatically.

In a possible embodiment, the above haptic feedback control method provided in the embodiment of the present disclosure further includes: controlling the display screen to display an adjustment information page having a memory button upon receiving an instruction to display the page on the display screen; after adjusting the posture of the vehicle seat, the user clicks the memory button for a preset duration to store an adjusted posture of the vehicle seat, so that when the memory button is clicked subsequently, the vehicle seat is adjusted to the adjusted posture through a one-key click directly.

Correspondingly, an embodiment of the present disclosure further provides a haptic feedback control device. The device includes: a display screen configured to display an adjustment information page having a 3D model of a vehicle seat; and a processor configured to execute any one of the above haptic feedback control methods provided in the embodiments of the present disclosure.

In a possible embodiment, in the above haptic feedback control device provided in the embodiment of the present disclosure, the display screen includes a touch module, a display module, and a vibration sensor, the touch module being arranged on one side of a display surface of the display module, and the vibration sensor being arranged on one side, facing away from the touch module, of the display module.

In a possible embodiment, in the above haptic feedback control device provided in the embodiment of the present disclosure, the vibration sensor includes piezoelectric devices, the piezoelectric devices being arranged on edges of two sides of the display module, or the plurality of piezoelectric devices distributed in an array being arranged on an entire surface of one side, facing away from the touch module, of the display module.

In a possible embodiment, in the above haptic feedback control device provided in the embodiment of the present disclosure, the adjustment information page displayed on the display screen further has a touch adjustment button, the touch adjustment button including: a front-back position adjustment button, an up-down position adjustment button, a back rest angle adjustment button, a lumbar rest position adjustment button, and a head rest position adjustment button.

In a possible embodiment, in the above haptic feedback control device provided in the embodiment of the present disclosure, the 3D model of the vehicle seat is positioned in a central area of the adjustment information page, the front-back position adjustment button is arranged in a horizontal direction, the up-down position adjustment button is arranged in a vertical direction, the back rest angle adjustment button has a cambered shape, a raised surface of the cambered shape faces away from a back rest, and the front-back position adjustment button, the up-down position adjustment button, the back rest angle adjustment button, the lumbar rest position adjustment button, and the head rest position adjustment button are arranged around the 3D model of the vehicle seat.

In a possible embodiment, in the above haptic feedback control device provided in the embodiment of the present disclosure, the adjustment information page displayed on the display screen further has a main driver button, a passenger button, a default button, and a memory button.

In a possible embodiment, in the above haptic feedback control device provided in the embodiment of the present disclosure, the main driver button, the passenger button, the default button, and the memory buttons are positioned at the bottom of the adjustment information page.

Correspondingly, an embodiment of the present disclosure further provides a computer-readable storage medium storing a computer program, where the computer program implements any one of the above haptic feedback control methods provided in the embodiments of the present disclosure when executed by a processor.

BRIEF DESCRIPTION OF THE DRAWINGS

FIG. 1 is a schematic flowchart of a haptic feedback control method according to an embodiment of the present disclosure;

FIG. 2 is a schematic structural diagram of an adjustment information page according to an embodiment of the present disclosure;

DETAILED DESCRIPTION OF THE EMBODIMENTS

Figure 3:
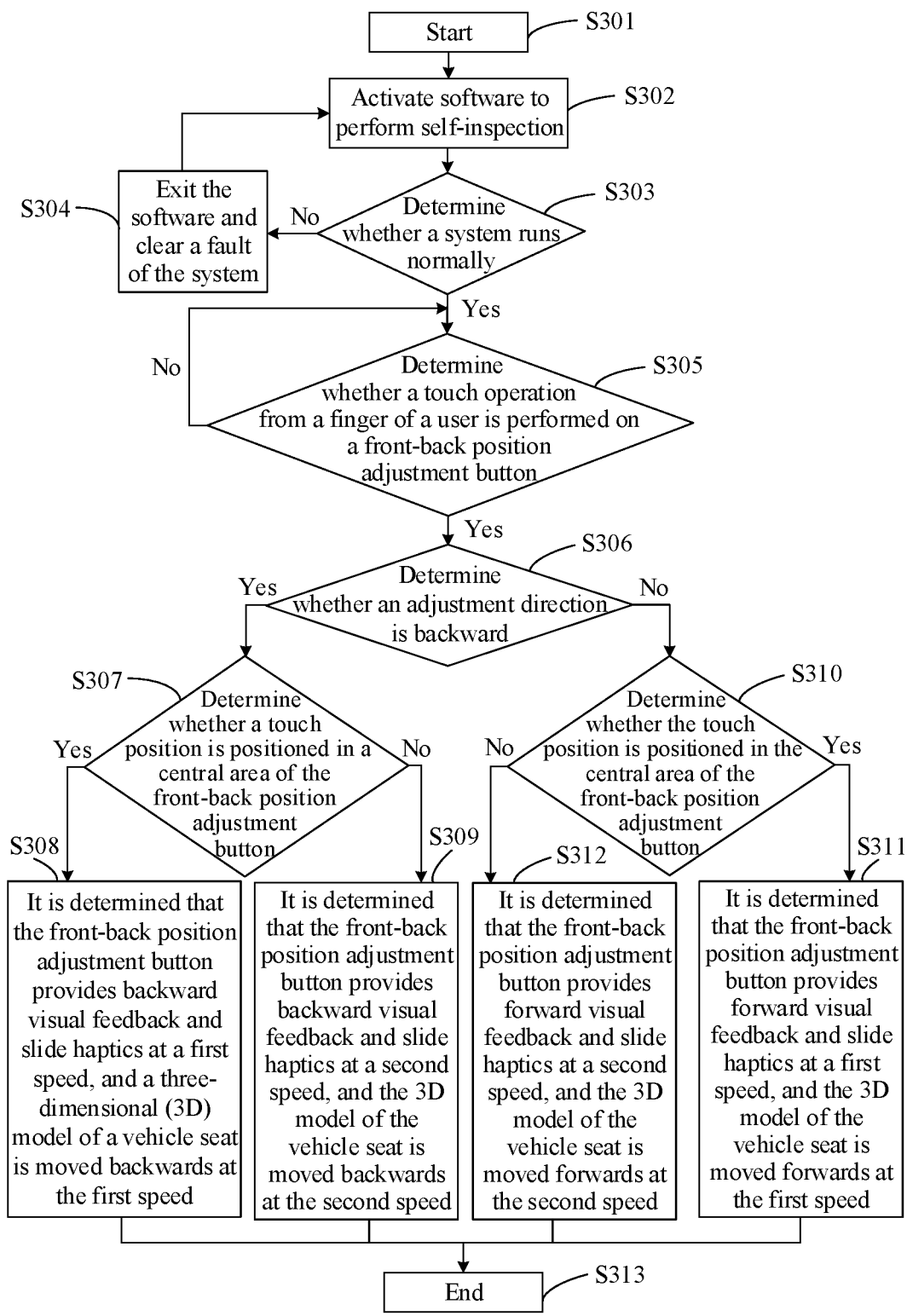
FIG. 3 is a schematic flowchart of adjusting a front-back position of a seat according to an embodiment of the present disclosure.

In order to make the objectives, technical solutions, and advantages in the embodiments of the present disclosure clearer, the technical solutions in the embodiments of the present disclosure will be clearly and completely described below with reference to the accompanying drawings in the embodiments of the present disclosure. It is obvious that the described embodiments are some embodiments rather than all embodiments of the present disclosure. Moreover, the embodiments of the present disclosure and features in the embodiments can be combined with one another without conflict. Based on the described embodiments of the present disclosure, all other embodiments obtained by those of ordinary skill in the art without inventive efforts fall within the scope of protection of the present disclosure.

Unless otherwise defined, technical terms or scientific terms used in the present disclosure should have ordinary meanings understood by those of ordinary skill in the art to which the present disclosure belongs. As used in the present disclosure, "comprise", "encompass", etc. mean that elements or objects appearing before the word cover elements or objects listed after the word and their equivalents, but do not exclude other elements or objects. "Connection", "connected", etc. are not limited to physical or mechanical connections, but can include electrical connections, whether direct or indirect. The terms "inner", "outer", "upper", "lower", etc. are merely used to indicate relative position relations, and when the absolute position of a described object changes, the relative position relation may change accordingly.

It should be noted that sizes and shapes of all patterns in the accompanying drawings do not reflect true scales and are merely intended to illustrate the contents of the present disclosure. Moreover, identical or similar reference numerals denote identical or similar elements or elements having identical or similar functions throughout.

An embodiment of the present disclosure provides a haptic feedback control method. As shown in FIG. 1, the method is used for adjusting a vehicle seat and includes:

S101, a display screen is controlled to display an adjustment information page having a touch adjustment button and a three-dimensional (3D) model of the vehicle seat upon receiving an instruction to display the page on the display screen, where the display screen has a vibration sensor.

Optionally, FIG. 2 shows the adjustment information page displayed on the display screen. As shown in FIG. 2, the adjustment information page includes the 3D model of the vehicle seat and the touch adjustment button 10.

S102, a touch instruction, on the touch adjustment button, from a user is received, a posture of the vehicle seat is adjusted through the touch adjustment button, the vibration sensor is controlled to perform haptic feedback at a position of the touch adjustment button, and the display screen is controlled to synchronously display a posture of the 3D model of the vehicle seat that is the same as that of the vehicle seat.

In the above haptic feedback control method provided in embodiments of the present disclosure, in a process of adjusting the vehicle seat, the user may experience vision through the display screen and feel a posture change of the vehicle seat intuitively through the posture of the 3D model of the vehicle seat displayed on the display screen, so as to adjust the vehicle seat scientifically and rationally, thereby ensuring safe driving. Currently, the vehicle seat is basically adjusted by adjusting a physical entity button or a mechanical switch on one side of the seat. However, in embodiments of the present disclosure, the touch adjustment button on the display screen replaces the physical entity button or the mechanical switch for adjusting the vehicle seat, so that the vehicle seat may be controlled and adjusted in a virtual and visual mode, and a human-computer interaction is friendlier. Also, the display screen has the vibration sensor. In this way, the haptic feedback is realized to make the user feel the authenticity of the touch adjustment button while the vehicle seat is controlled and adjusted in the virtual and visual mode.

Optionally, in embodiments of the present disclosure, the display screen arranged on a vehicle is a display screen integrating display, touch, and haptic functions and may be a liquid crystal display screen, etc. Optionally, the display screen includes a display module, a touch module, and a vibration sensor, the touch module being arranged on one side of a display surface of the display module, the vibration sensor being arranged on one side, facing away from the touch module, of the display module, the vibration sensor including piezoelectric devices, the piezoelectric devices being capable of being arranged on edges of two sides of the display module, or the plurality of piezoelectric devices distributed in an array being arranged on an entire surface of one side, facing away from the touch module, of the display module. The piezoelectric device is configured to vibrate under the driving of an alternating voltage signal to drive the display module to vibrate, thereby realizing the haptic feedback.

Optionally, the piezoelectric device may be a piezoelectric film or a piezoelectric sheet, and a given voltage signal may provide vibration excitation directly, so that the display screen generates a haptic effect.

During specific implementation, the display screen in embodiments of the present disclosure may be embedded in a steering wheel of the vehicle, and a screen of the display screen is positioned in a central position right in front of a main driver position.

During specific implementation, in the above haptic feedback control method provided in embodiments of the present disclosure, as shown in FIG. 2, the touch adjustment button 10 is provided with strip-like areas (for example, 101, 102, 103). The step that a touch instruction, on the touch adjustment button, is received from a user includes: a slide touch operation instruction, in an extension direction of the strip-like areas (101, 102, 103), is received from the user. In this way, the user may slide the strip-like areas (101, 102, 103) to adjust the posture of the vehicle seat with a finger.

During specific implementation, in the above haptic feedback control method provided in embodiments of the present disclosure, as shown in FIG. 2, the touch adjustment button may include at least one of the following: a front-back position adjustment button, an up-down position adjustment button, and a back rest angle adjustment button. The strip-like areas (101, 102, 103) may correspond to the front-back position adjustment button 101, the up-down position adjustment button 102, and the back rest angle adjustment button 103, respectively.

During specific implementation, in the above haptic feedback control method provided in embodiments of the present disclosure, as shown in FIG. 2, the step that a posture of the vehicle seat is adjusted may include at least one of the following: a front-back position of the vehicle seat is adjusted, an up-down position of the vehicle seat is adjusted, and a pitch angle of a back rest of the vehicle seat is adjusted. Optionally, the front-back position, the up-down position, and the pitch angle of the back rest of the vehicle seat are adjusted through the front-back position adjustment button 101, the up-down position adjustment button 102, and the back rest angle adjustment button 103, respectively.

Optionally, as shown in FIG. 2, the 3D model of the vehicle seat may be positioned in a central area of the adjustment information page, and the 3D model of the vehicle seat is placed in the central area of the adjustment information page to change the posture of the seat under control correspondingly, so that the user may operate and observe the change of the posture of the seat in real time conveniently.

Optionally, as shown in FIG. 2, the front-back position adjustment button 101 may be arranged in a horizontal direction, the up-down position adjustment button 102 may be arranged in a vertical direction, the back rest angle adjustment button 103 may have a cambered shape, and a raised surface of the cambered shape faces away from the back rest of the vehicle seat.

Optionally, as shown in FIG. 2, the user rubs against the front-back position adjustment button 101 with a finger in the horizontal direction, the finger will feel slide friction haptic feedback, and a horizontal position of the 3D model of the vehicle seat will be moved back and forth correspondingly. The user rubs against the up-down position adjustment button 102 with a finger in the vertical direction, the finger will feel slide friction haptic feedback, and the horizontal position of the 3D model of the vehicle seat will be moved up and down correspondingly. The user rubs against the back rest angle adjustment button 103 with a finger along a circular track, the finger will feel rotary friction haptic feedback, and the pitch angle of the back rest of the 3D model of the vehicle seat will be rotated correspondingly. The posture change of the vehicle seat is performed in synchronization with that of the 3D model of the vehicle seat.

During specific implementation, as shown in FIG. 2, the above haptic feedback control method provided in the embodiment of the present disclosure further includes: the posture of the vehicle seat is adjusted at a first speed upon receiving a slide touch operation, along central positions of the strip-like areas (101, 102, 103), from the user.

The posture of the vehicle seat is adjusted at a second speed upon receiving a slide touch operation, along edge positions of the strip-like areas (101, 102, 103), from the user.

The first speed is less than the second speed. Optionally, when the finger slides central positions of the front-back position adjustment button 101, the up-down position adjustment button 102, and the back rest angle adjustment button 103, the vehicle seat has a small adjustment speed. When the finger slides edge positions of the front-back position adjustment button 101, the up-down position adjustment button 102, and the back rest angle adjustment button 103, the vehicle seat has a large adjustment speed.

During specific implementation, in the above haptic feedback control method provided in the embodiment of the present disclosure, as shown in FIG. 2, the touch adjustment button 10 is provided with a plurality of blocky areas (for example, 104, 105) indicating different directions. The step that a touch instruction, on the touch adjustment button, from a user includes: a click touch operation instruction, on the blocky areas (104, 105), from the user is received. In this way, the user may click the blocky areas (104, 105) with the finger to adjust the posture of the vehicle seat.

During specific implementation, in the above haptic feedback control method provided in the embodiment of the present disclosure, as shown in FIG. 2, the touch adjustment button may further include at least one of the following: a lumbar rest position adjustment button and a head rest position adjustment button. The blocky areas (104, 105) may correspond to the lumbar rest position adjustment button 104 and the head rest position adjustment button 105, respectively.

During specific implementation, in the above haptic feedback control method provided in the embodiment of the present disclosure, as shown in FIG. 2, the step that a posture of the vehicle seat is adjusted may further include at least one of the following: a position of a lumbar rest of the vehicle seat is adjusted and a position of a head rest of the vehicle seat is adjusted. Optionally, the position of the lumbar rest and the position of the head rest of the vehicle seat are adjusted through the lumbar rest position adjustment button 104 and the head rest position adjustment button 105, respectively.

Optionally, as shown in FIG. 2, the lumbar rest position adjustment button 104 may be circular, and has two touch keys in directions opposite each other for adjusting a front-back position of the lumbar rest in the horizontal direction and two touch keys in directions opposite each other for adjusting an up-down position of the lumbar rest in the vertical direction. The head rest position adjustment button 105 may also be circular, and has two touch keys in directions opposite each other for adjusting a front-back position of the head rest in the horizontal direction and two touch keys in directions opposite each other for adjusting an up-down position of the head rest in the vertical direction. When the user selects and presses a four-way touch key of the lumbar rest position adjustment button 104 or the head rest position adjustment button 105 with a finger in a certain direction, the finger will feel haptic feedback of pressing, and the position of the lumbar rest or the head rest of the 3D model of the vehicle seat will be changed correspondingly.

Optionally, as shown in FIG. 2, the front-back position adjustment button 101, the up-down position adjustment button 102, the back rest angle adjustment button 103, the lumbar rest position adjustment button 104, and the head rest position adjustment button 105 may be arranged around the 3D model of the vehicle seat.

During specific implementation, as shown in FIG. 2, the above haptic feedback control method provided in the embodiment of the present disclosure further includes: the display screen is controlled to display an adjustment information page having a main driver button 20 and a passenger button 30 upon receiving an instruction to display the page on the display screen in step S101.

The main driver button 20 or the passenger button 30 is clicked according to demands of the user to adjust a posture of a main driver seat or a passenger seat. Also, the posture of the main driver seat and the posture of the passenger seat are both operated by a main driver, so that a passenger at a passenger position may be prevented from interfering with the driver, thereby ensuring driving safety.

During specific implementation, as shown in FIG. 2, the above haptic feedback control method provided in the embodiment of the present disclosure further includes: the display screen is controlled to display an adjustment information page having a default button 40 upon receiving an instruction to display the page on the display screen in step S101.

The user clicks the default button 40 before adjusting the posture of the vehicle seat, so that the posture of the vehicle seat is adjusted to a factory posture of the vehicle seat automatically. Optionally, owing to individual differences, the users have different demands for the posture of the vehicle seat, so that the user may click the default button 40 to adjust the posture of the vehicle seat to the factory posture of the vehicle seat automatically, and the driver who will drive the vehicle may readjust the posture of the vehicle seat conveniently.

During specific implementation, as shown in FIG. 2, the above haptic feedback control method provided in the embodiment of the present disclosure further includes: the display screen is controlled to display an adjustment information page having memory buttons (501, 502, 503) upon receiving an instruction to display the page on the display screen in step S101.

After the posture of the vehicle seat is adjusted, the user clicks the memory button (for example, 501) for a preset duration (including, but not limited to, 3 seconds) to store an adjusted posture of the vehicle seat. When the memory button 501 is clicked subsequently, the vehicle seat is adjusted to the adjusted posture through one-key click directly. Optionally, when the driver of the vehicle is a certain driver all the time, since the user adjusts the posture of the vehicle seat through at least one of the front-back position adjustment button 101, the up-down position adjustment button 102, the back rest angle adjustment button 103, the lumbar rest position adjustment button 104, and the head rest position adjustment button 105 when driving the vehicle for the first time, the posture of the vehicle seat satisfies the demands of the user. When the user uses the vehicle subsequently, in order to prevent the driver from readjusting the vehicle seat each time, the memory button 501 may be arranged on the adjustment information page displayed on the display screen. Therefore, when a state of the vehicle seat is adjusted for the first time, the memory button 501 may be clicked for the preset duration (for example, 3 seconds) to store the adjusted posture of the vehicle seat. When re-driving the vehicle, the user clicks the memory button 501 directly, so that the vehicle seat may be adjusted to the adjusted posture of last driving directly, providing a shortcut, and eliminating a redundant operation of repeatedly adjusting the vehicle seat by the same driver.

Optionally, as shown in FIG. 2, since certain fixed users, for example, three users, may share the same vehicle, three memory buttons (501, 502, 503) are arranged on the adjustment information page displayed on the display screen provided in the embodiment of the present disclosure. In order to eliminate the redundant operation of the three drivers to repeatedly adjust the vehicle seat, the corresponding memory buttons (501, 502, 503) may be employed to store the posture of the seat demanded by the user when each user adjusts the posture of the seat for the first time. For example, user A employs the memory button 501 to store the posture of the seat demanded by user A. When driving the vehicle subsequently, user A may click the memory button 501 directly to adjust the seat to the posture demanded by user A. User B employs the memory button 502 to store the posture of the seat demanded by user B. When driving the vehicle subsequently, user B may click the memory button 502 directly to adjust the seat to the posture demanded by user B. User C employs the memory button 503 to store the posture of the seat demanded by user C. When driving the vehicle subsequently, the user C may click the memory button 503 directly to adjust the seat to the posture demanded by user C.

During specific implementation, in the above haptic feedback control method provided in the embodiment of the present disclosure, as shown in FIG. 2, the main driver button 20, the passenger button 30, the default button 40, and the memory buttons (501, 502, 503) may be positioned at the bottom of the adjustment information page.

The haptic feedback control method provided in the embodiment of the present disclosure is described in detail below.

Example 1

A method for adjusting a front-back position of a vehicle seat is as shown in FIG. 3. FIG. 3 is a schematic flowchart of adjusting a front-back position.

First, a user activates a vehicle, which is shown as step S301 in FIG. 3. Then the vehicle activates software in a system automatically to perform self-inspection, which is shown as step S302 in FIG. 3. Next, the system software determines whether the system runs normally, which is shown as step S303 in FIG. 3. If not, the system software is exited and a fault of the system is cleared, which is shown as step S304 in FIG. 3, until the system runs normally, and then subsequent operations are performed. If yes, step S305 is performed to determine whether a touch operation from a finger of the user is performed on a front-back position adjustment button. If yes, step S306 is performed to determine whether an adjustment direction is backward. If yes, step S307 is performed to determine whether a touch position is positioned in a central area (that is, a first speed area) of the front-back position adjustment button. If yes, it is determined that the front-back position adjustment button provides backward visual feedback and slide haptic feedback at a first speed, and a 3D model of the vehicle seat is moved backwards at the first speed (S308). When determining whether the touch position is positioned in the central area of the front-back position adjustment button in step S307, if not, it is determined that the front-back position adjustment button provides backward visual feedback and slide haptic feedback at a second speed, and the 3D model of the vehicle seat is moved backwards at the second speed (S309). When determining whether the adjustment direction is backward in step S306, if not, step S310 is performed to determine whether the touch position is positioned in the central area (that is, the first speed area) of the front-back position adjustment button. If yes, it is determined that the front-back position adjustment button provides forward visual feedback and slide haptic feedback at the first speed, and the 3D model of the vehicle seat is moved forwards at the first speed (S311). When determining whether the touch position is positioned in the central area of the front-back position adjustment button in step S310, if not, it is determined that the front-back position adjustment button provides forward visual feedback and slide haptic feedback at the second speed, and the 3D model of the vehicle seat is moved forwards at the second speed (S312). Finally, a front-back position adjustment operation of the vehicle seat is ended, that is, step S313 ends.

Example 2

Figure 4:
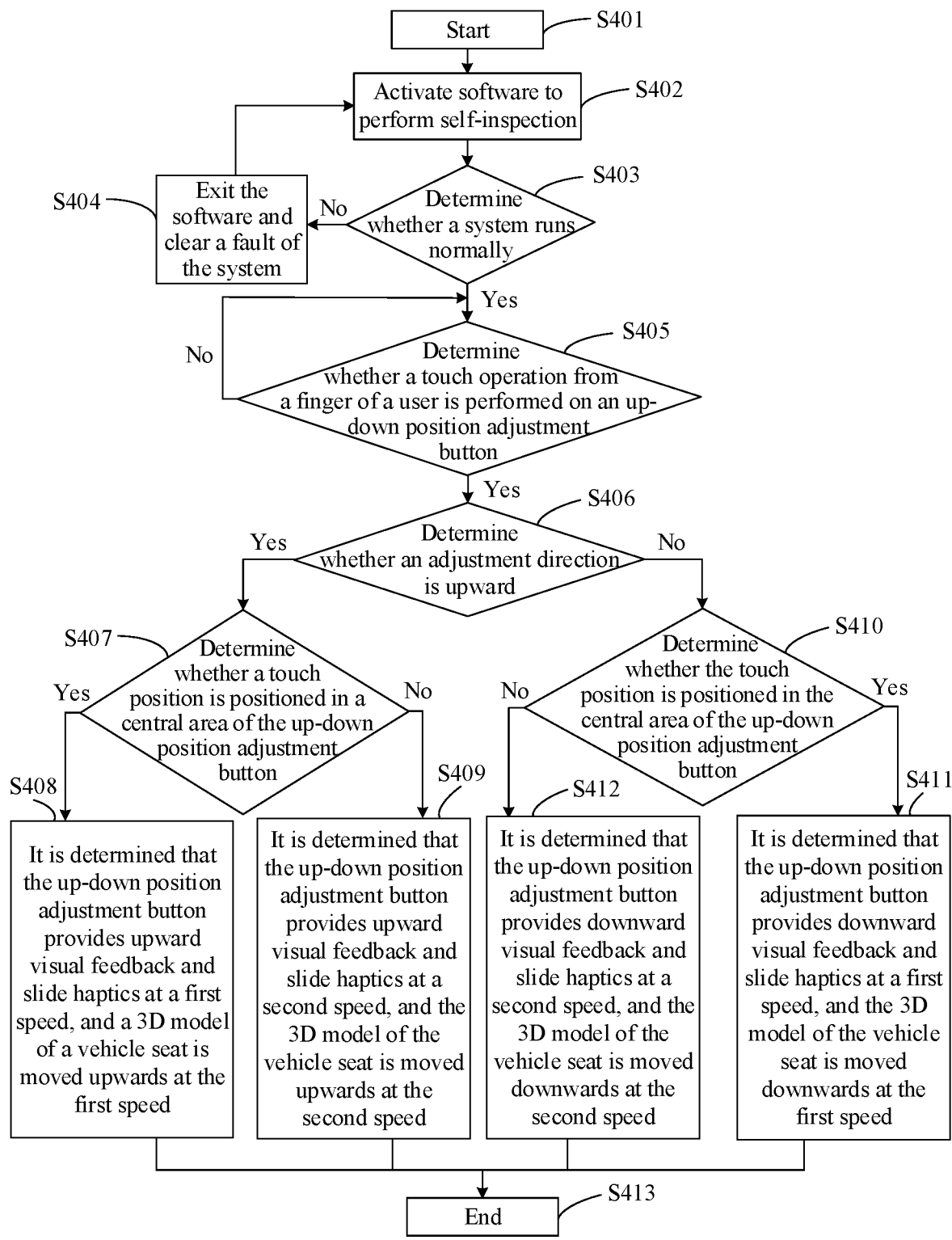
FIG. 4 is a schematic flowchart of adjusting an up-down position of a seat according to an embodiment of the present disclosure.

A method for adjusting an up-down position of a vehicle seat is as shown in FIG. 4. FIG. 4 is a schematic flowchart of adjusting an up-down position.

First, a user activates a vehicle, which is shown as step S401 in FIG. 4. Then the vehicle activates software in a system automatically to perform self-inspection, which is shown as step S402 in FIG. 4. Next, the system software determines whether the system runs normally, which is shown as step S403 in FIG. 4. If not, the system software is exited and a fault of the system is cleared, which is shown as step S404 in FIG. 4, until the system runs normally, and then subsequent operations are performed. If yes, step S405 is performed to determine whether a touch operation from a finger of the user is performed on an up-down position adjustment button. If yes, step S406 is performed to determine whether an adjustment direction is upward. If yes, step S407 is performed to determine whether a touch position is positioned in a central area (that is, a first speed area) of the up-down position adjustment button. If yes, it is determined that the up-down position adjustment button provides upward visual feedback and slide haptic feedback at a first speed, and a 3D model of the vehicle seat is moved upwards at the first speed (S408). When determining whether the touch position is positioned in the central area of the up-down position adjustment button in step S407, if not, it is determined that the up-down position adjustment button provides upward visual feedback and slide haptic feedback at a second speed, and the 3D model of the vehicle seat is moved upwards at the second speed (S409). When determining whether the adjustment direction is upward in step S406, if not, step S410 is performed to determine whether the touch position is positioned in the central area (that is, the first speed area) of the up-down position adjustment button. If yes, it is determined that the up-down position adjustment button provides downward visual feedback and slide haptic feedback at the first speed, and the 3D model of the vehicle seat is moved downwards at the first speed (S411). When determining whether the touch position is positioned in the central area of the up-down position adjustment button in step S410, if not, it is determined that the up-down position adjustment button provides downward visual feedback and slide haptic feedback at the second speed, and the 3D model of the vehicle seat is moved downwards at the second speed (S412). Finally, an up-down position adjustment operation of the vehicle seat is ended, that is, step S413 ends.

Example 3

Figure 5:
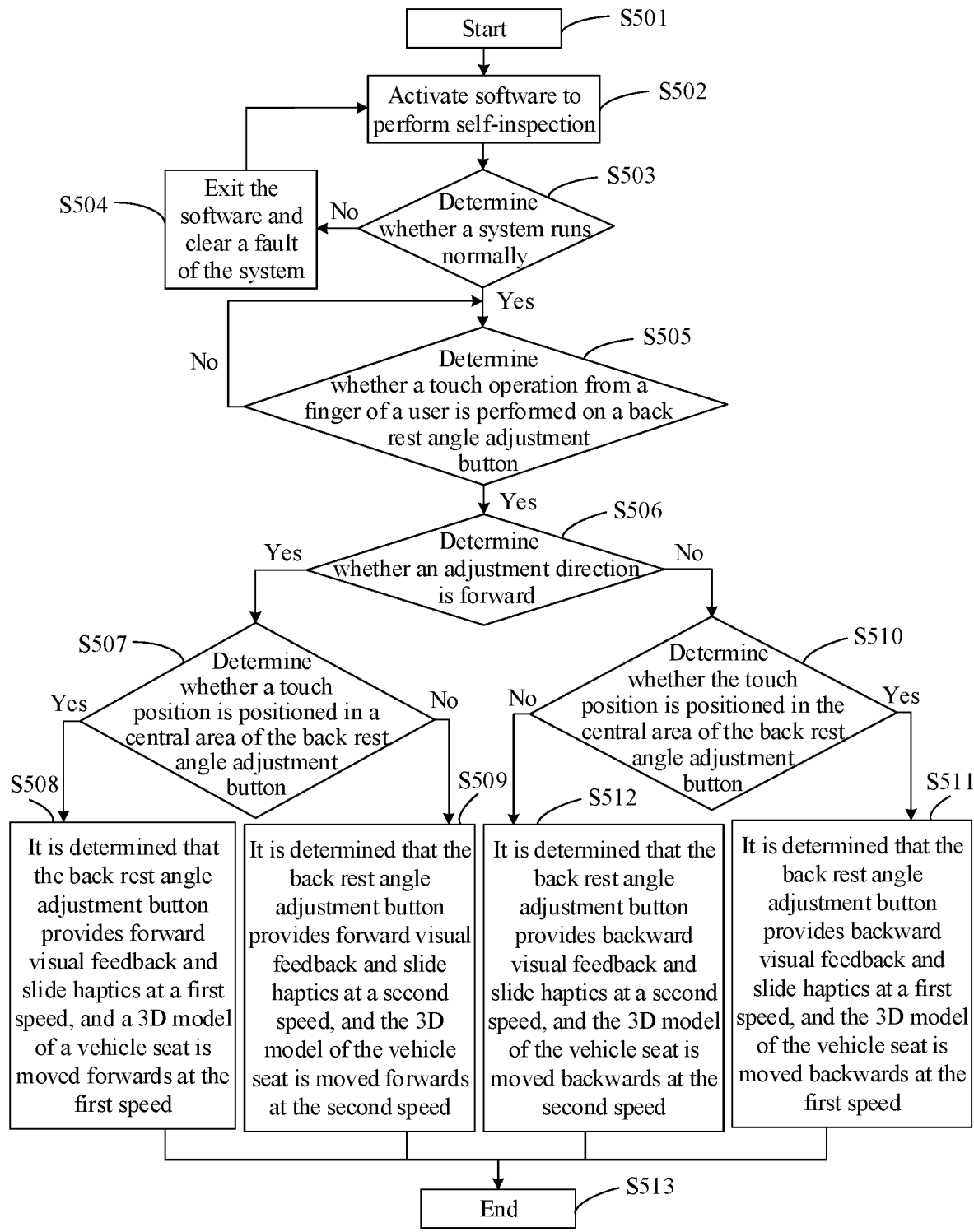
FIG. 5 is a schematic flowchart of adjusting a back rest angle of a seat according to an embodiment of the present disclosure.

A method for adjusting a pitch angle of a back rest of a vehicle seat is as shown in FIG. 5. FIG. 5 is a schematic flowchart of adjusting a pitch angle of a back rest.

First, a user activates a vehicle, which is shown as step S501 in FIG. 5. Then the vehicle activates software in a system automatically to perform self-inspection, which is shown as step S502 in FIG. 5. Next, the system software determines whether the system runs normally, which is shown as step S503 in FIG. 5. If not, the system software is exited and a fault of the system is cleared, which is shown as step S504 in FIG. 5, until the system runs normally, and then subsequent operations are performed. If yes, step S505 is performed to determine whether a touch operation from a finger of the user is performed on a back rest angle adjustment button. If yes, step S506 is performed to determine whether an adjustment direction is forward. If yes, step S507 is performed to determine whether a touch position is positioned in a central area (that is, a first speed area) of the back rest angle adjustment button. If yes, it is determined that the back rest angle adjustment button provides forward visual feedback and slide haptic feedback at a first speed, and a 3D model of the vehicle seat is moved forwards at the first speed (S508). When determining whether the touch position is positioned in the central area of the back rest angle adjustment button in step S507, if not, it is determined that the back rest angle adjustment button provides forward visual feedback and slide haptic feedback at a second speed, and the 3D model of the vehicle seat is moved forwards at the second speed (S509). When determining whether the adjustment direction is forward in step S506, if not, step S510 is performed to determine whether the touch position is positioned in the central area (that is, the first speed area) of the back rest angle adjustment button. If yes, it is determined that the back rest angle adjustment button provides backward visual feedback and slide haptic feedback at the first speed, and the 3D model of the vehicle seat is moved backwards at the first speed (S511). When determining whether the touch position is positioned in the central area of the back rest angle adjustment button in step S510, if not, it is determined that the back rest angle adjustment button provides backward visual feedback and slide haptic feedback at the second speed, and the 3D model of the vehicle seat is moved backwards at the second speed (S512). Finally, a back rest angle adjustment operation of the vehicle seat is ended, that is, step S513 ends.

Example 4

Figure 6:
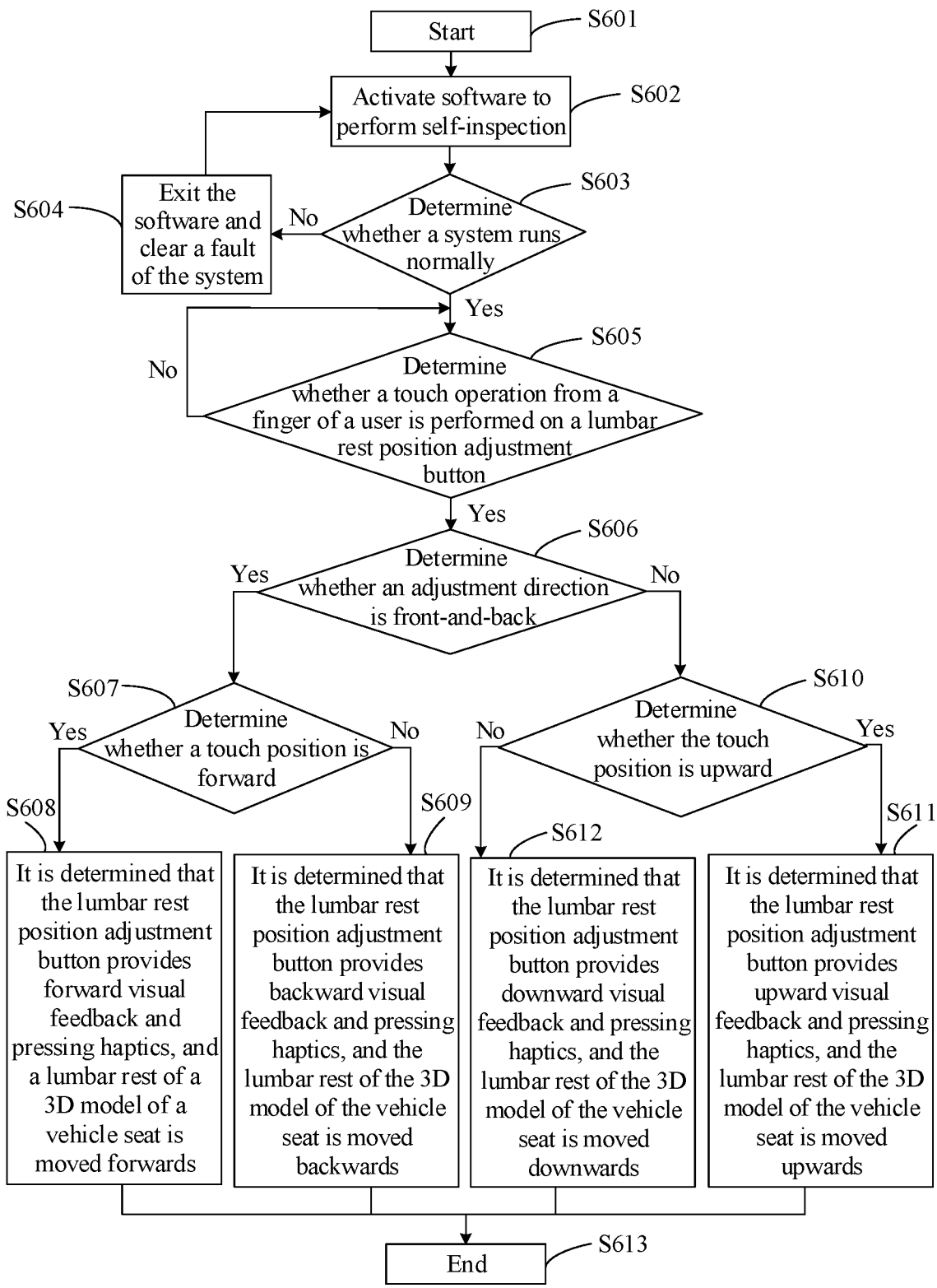
FIG. 6 is a schematic flowchart of adjusting a lumbar rest position according to an embodiment of the present disclosure.

A method for adjusting a position of a lumbar rest of a vehicle seat is as shown in FIG. 6. FIG. 6 is a schematic flowchart of adjusting a lumbar rest position.

First, a user activates a vehicle, which is shown as step S601 in FIG. 6. Then the vehicle activates software in a system automatically to perform self-inspection, which is shown as step S602 in FIG. 6. Next, the system software determines whether the system runs normally, which is shown as step S603 in FIG. 6. If not, the system software is exited and a fault of the system is cleared, which is shown as step S604 in FIG. 6, until the system runs normally, and then subsequent operations are performed. If yes, step S605 is performed to determine whether a touch operation from a finger of the user is performed on a lumbar rest position adjustment button. If yes, step S606 is performed to determine whether an adjustment direction is front-and-back. If yes, step S607 is performed to determine whether a touch position is forward. If yes, it is determined that the lumbar rest position adjustment button provides forward visual feedback and pressing haptic feedback, and a lumbar rest of a 3D model of the vehicle seat is moved forwards (S608). When determining whether the touch position is forward in step S607, if not, it is determined that the lumbar rest position adjustment button provides backward visual feedback and pressing haptic feedback, and the lumbar rest of the 3D model of the vehicle seat is moved backwards (S609). When determining whether the adjustment direction is front-and-back in step S606, if not, step S610 is performed to determine whether the touch position is upward. If yes, it is determined that the lumbar rest position adjustment button provides upward visual feedback and pressing haptic feedback, and the lumbar rest of the 3D model of the vehicle seat is moved upwards (S611). When determining whether the touch position is upward in step S610, if not, it is determined that the lumbar rest position adjustment button provides downward visual feedback and pressing haptic feedback, and the lumbar rest of the 3D model of the vehicle seat is moved downwards (S612). Finally, a lumbar rest position adjustment operation of the vehicle seat is ended, that is, step S613 ends.

Example 5

Figure 7:
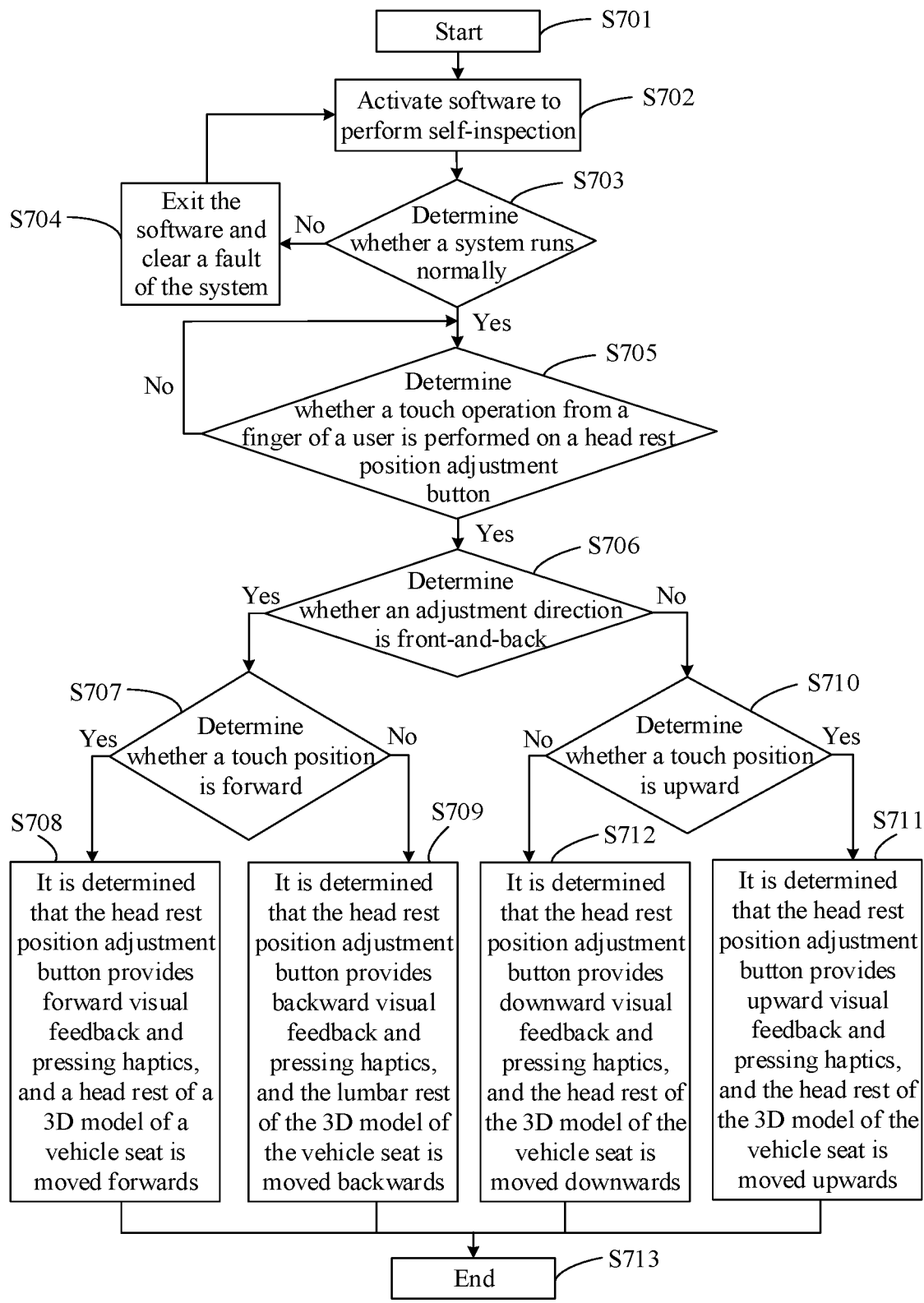
FIG. 7 is a schematic flowchart of adjusting a head rest position according to an embodiment of the present disclosure.

A method for adjusting a position of a head rest of a vehicle seat is as shown in FIG. 7. FIG. 7 is a schematic flowchart of adjusting a head rest position.

First, a user activates a vehicle, which is shown as step S701 in FIG. 7. Then the vehicle activates software in a system automatically to perform self-inspection, which is shown as step S702 in FIG. 7. Next, the system software determines whether the system runs normally, which is shown as step S703 in FIG. 7. If not, the system software is exited and a fault of the system is cleared, which is shown as step S704 in FIG. 7, until the system runs normally, and then subsequent operations are performed. If yes, step S705 is performed to determine whether a touch operation from a finger of the user is performed on a head rest position adjustment button. If yes, step S706 is performed to determine whether an adjustment direction is front-and-back. If yes, step S707 is performed to determine whether a touch position is forward. If yes, it is determined that the head rest position adjustment button provides forward visual feedback and pressing haptic feedback, and a head rest of a 3D model of the vehicle seat is moved forwards (S708). When determining whether the touch position is forward in step S707, if not, it is determined that the head rest position adjustment button provides backward visual feedback and pressing haptic feedback, and the head rest of the 3D model of the vehicle seat is moved backwards (S709). When determining whether the adjustment direction is front-and-back in step S706, if not, step S710 is performed to determine whether the touch position is upward. If yes, it is determined that the head rest position adjustment button provides upward visual feedback and pressing haptic feedback, and the head rest of the 3D model of the vehicle seat is moved upwards (S711). When determining whether the touch position is upward in step S710, if not, it is determined that the head rest position adjustment button provides downward visual feedback and pressing haptic feedback, and the head rest of the 3D model of the vehicle seat is moved downwards (S712). Finally, a head rest position adjustment operation of the vehicle seat is ended, that is, step S713 ends.

In conclusion, in the haptic feedback control method provided in the embodiment of the present disclosure, in a process of adjusting the vehicle seat, the user may experience the visual feedback and haptic feedback through the display screen having a haptic function, and feel the posture change of the seat intuitively, so as to adjust the seat scientifically and rationally, thereby ensuring safe driving.

Figure 8:
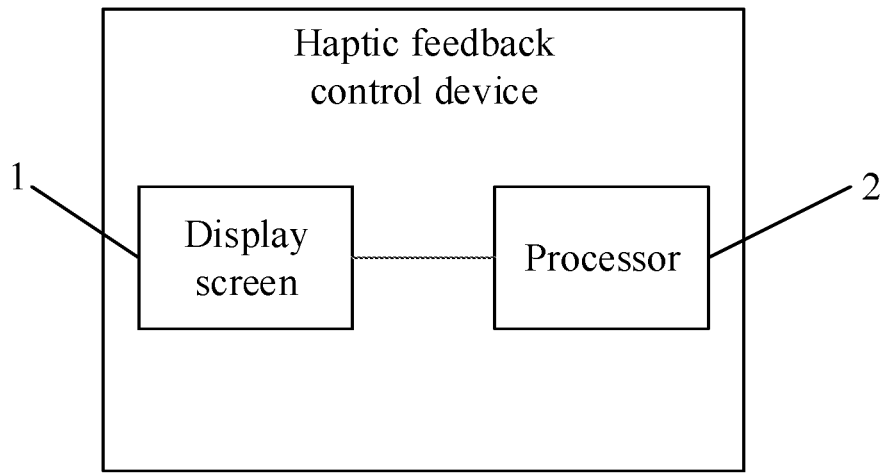
FIG. 8 is a schematic structural diagram of a haptic feedback control device according to an embodiment of the present disclosure.

On the basis of the same inventive concept, an embodiment of the present disclosure further provides a haptic feedback control device. As shown in FIG. 8, the device includes:

- a display screen 1 configured to display an adjustment information page having a 3D model of a vehicle seat; and
- a processor 2 configured to execute any one of the above haptic feedback control methods provided in the embodiments of the present disclosure.

Optionally, the processor 2 is configured to:

control the display screen to display an adjustment information page having a touch adjustment button and a 3D model of the vehicle seat upon receiving an instruction to display the page on the display screen, where the display screen has a vibration sensor; and receive a touch instruction, on the touch adjustment button, from a user, adjust a posture of the vehicle seat through the touch adjustment button, control the vibration sensor to perform haptic feedback at a position of the touch adjustment button, and control the display screen to synchronously display a posture of the 3D model of the vehicle seat that is the same as that of the vehicle seat.

In the above haptic feedback control device provided in the embodiment of the present disclosure, in a process of adjusting the vehicle seat, the user may experience vision through the display screen, and feel a posture change of the vehicle seat intuitively through the posture of the 3D model of the vehicle seat, so as to adjust the seat scientifically and rationally, thereby ensuring safe driving.

The processor 2 may be a general-purpose processor, such as a central processing unit (CPU), a digital signal processor (DSP), an application specific integrated circuit (ASIC), a field programmable gate array (FPGA), or other programmable logic devices, a discrete gate or transistor logic device, and a discrete hardware component, and may implement or execute all the methods, steps, and logic blocks disclosed in embodiments of the present disclosure. The general-purpose processor may be a microprocessor, any conventional processor, etc. The steps of the method disclosed with reference to embodiment of the present disclosure may be directly implemented by a hardware processor, or by a combination of hardware and software modules in the processor.

Figure 9:
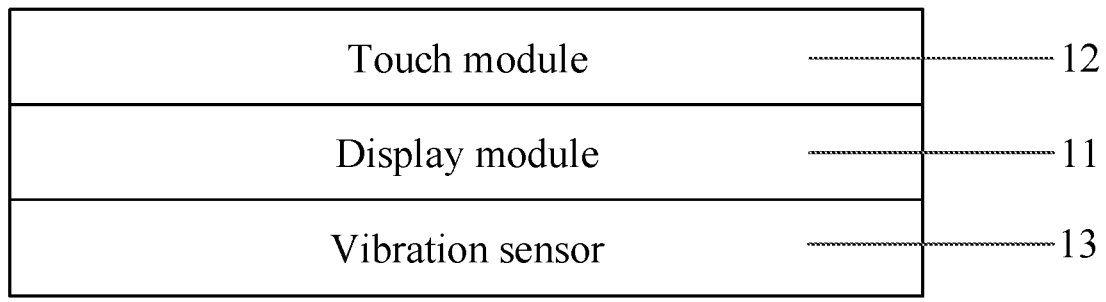
FIG. 9 is a sectional schematic structural diagram of a display screen according to an embodiment of the present disclosure.

During specific implementation, in the above haptic feedback control device provided in embodiments of the present disclosure, as shown in FIG. 9, the display screen 1 includes a display module 11, a touch module 12, and a vibration sensor 13, the touch module 12 being arranged on one side of a display surface of the display module 11, and the vibration sensor 13 being arranged on one side, facing away from the touch module 12, of the display module 11.

Figure 10:
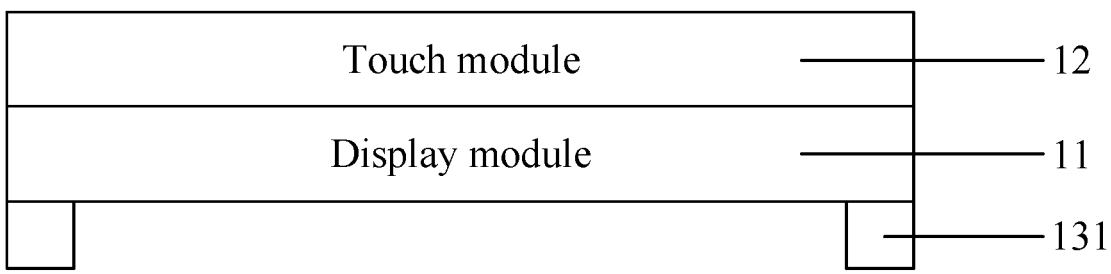
FIG. 10 is a specific sectional schematic structural diagram of the display screen in FIG. 9.
Figure 11:
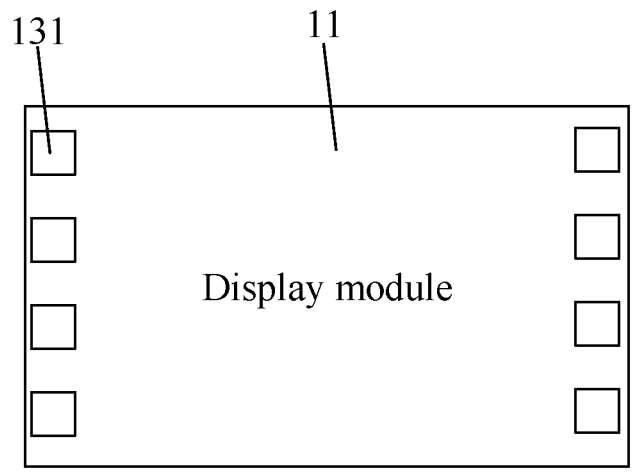
FIG. 11 is a planar schematic structural diagram of the display screen in FIG. 10.
Figure 12:
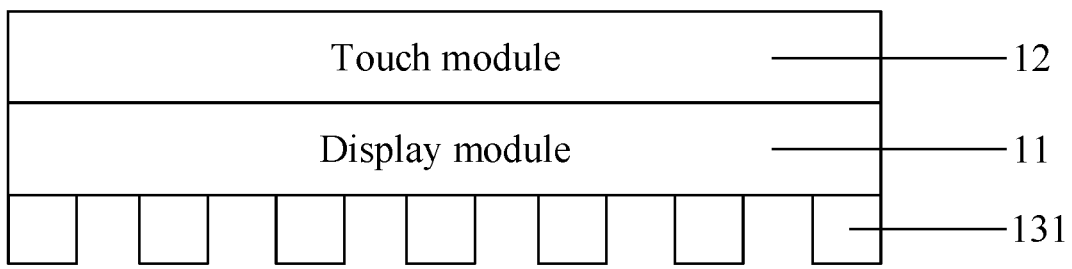
FIG. 12 is another specific sectional schematic structural diagram of the display screen in FIG. 9.
Figure 13:
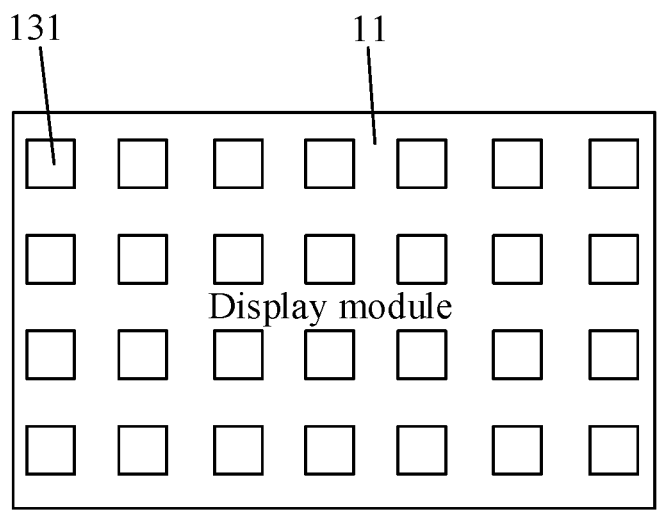
FIG. 13 is a planar schematic structural diagram of the display screen in FIG. 12.

During specific implementation, in the above haptic feedback control device provided in the embodiment of the present disclosure, as shown in FIGS. 10 and 11, where FIG. 10 is a sectional schematic diagram of the display screen, and FIG. 11 is a planar schematic diagram of the display screen, the vibration sensor 13 includes piezoelectric devices 131. As shown in FIG. 10, the piezoelectric devices 131 may be arranged on edges of two sides of the display module 11. Alternatively, as shown in FIGS. 12 and 13, where FIG. 12 is a sectional schematic diagram of the display screen, and FIG. 13 is a planar schematic diagram of the display screen, the plurality of piezoelectric devices 131 distributed in an array are arranged on an entire surface of one side, facing away from the touch module 12, of the display module 11. The piezoelectric device 131 is configured to vibrate under the driving of an alternating current voltage signal, so as to drive the display module 11 to vibrate, thereby realizing haptic feedback.

Optionally, the display screen may be a liquid crystal display screen.

Optionally, the piezoelectric device may be a piezoelectric film or a piezoelectric sheet, and a given voltage signal may provide vibration excitation directly, so that the display screen generates a haptic effect.

During specific implementation, the display screen in embodiments of the present disclosure may be embedded in a steering wheel of the vehicle, and a screen of the display screen is positioned in a central position right in front of a main driver position.

During specific implementation, in the above haptic feedback control device provided in the embodiment of the present disclosure, the adjustment information page displayed on the display screen further has a touch adjustment button, the touch adjustment button being capable of including: a front-back position adjustment button, an up-down position adjustment button, a back rest angle adjustment button, a lumbar rest position adjustment button, and a head rest position adjustment button. Optionally, for the touch adjustment button, reference may be made to the description of the touch adjustment button in the aforementioned haptic feedback control method, which will not be described in detail herein.

During specific implementation, in the above haptic feedback control device provided in embodiments of the present disclosure, the 3D model of the vehicle seat is positioned in a central area of the adjustment information page, the front-back position adjustment button is arranged in a horizontal direction, the up-down position adjustment button is arranged in a vertical direction, the back rest angle adjustment button has a cambered shape, a raised surface of the cambered shape faces away from a back rest, and the front-back position adjustment button, the up-down position adjustment button, the back rest angle adjustment button, the lumbar rest position adjustment button, and the head rest position adjustment button are arranged around the 3D model of the vehicle seat. Optionally, for the front-back position adjustment button, the up-down position adjustment button, the back rest angle adjustment button, the lumbar rest position adjustment button, and the head rest position adjustment button, reference may be made to the description of the front-back position adjustment button, the up-down position adjustment button, the back rest angle adjustment button, the lumbar rest position adjustment button, and the head rest position adjustment button in the aforementioned haptic feedback control method, which will not be described in detail herein.

During specific implementation, in the above haptic feedback control device provided in embodiments of the present disclosure, the adjustment information page displayed on the display screen further has a main driver button, a passenger button, a default button, and a memory button. Optionally, for the main driver button, the passenger button, the default button, and the memory button, reference may be made to the description of the main driver button, the passenger button, the default button, and the memory button in the aforementioned haptic feedback control method, which will not be described in detail herein.

During specific implementation, in the above haptic feedback control device provided in embodiments of the present disclosure, the main driver button, the passenger button, the default button, and the memory button are positioned at the bottom of the adjustment information page.

Based on the same inventive concept, an embodiment of the present disclosure further provides a computer-readable storage medium storing a computer program. The computer program implements any of the above haptic feedback control methods provided in embodiments of the present disclosure when executed by a processor.

The computer-readable storage medium provided in the embodiment of the present disclosure may be a computer-readable signal medium or a computer-readable storage medium or any combination of the computer-readable signal medium and the computer-readable storage medium. The computer-readable storage medium may be, but is not limited to, an electronic, magnetic, optical, electromagnetic, infrared, or semiconductor system, apparatus, or device, or a combination of any of the above. More specific instances of the computer-readable storage medium may include, but are not limited to, an electrical connection device having one or more wires, a portable computer magnetic disk, a hard disk, a random access memory (RAM), a read-only memory (ROM), an erasable programmable read-only memory (EPROM or flash), an optical fiber, a portable compact disk read-only memory (CD-ROM), an optical storage device, a magnetic storage device, or any suitable combination of the above.

In the haptic feedback control method, the haptic feedback control device, and a storage medium provided in embodiments of the present disclosure, in the process of adjusting the vehicle seat, the user may experience the vision through the display screen, and feel the posture change of the vehicle seat intuitively through the posture of the 3D model of the vehicle seat displayed on the display screen, so as to adjust the vehicle seat scientifically and rationally, thereby ensuring safe driving. Currently, the vehicle seat is basically adjusted through the physical entity button or the mechanical switch on one side of the seat. However, in the embodiment of the present disclosure, the touch adjustment button on the display screen replaces the physical entity button or the mechanical switch for adjusting the vehicle seat, so that the vehicle seat may be controlled and adjusted in the virtual and visual mode, and the human-computer interaction is friendlier. Also, the display screen has the vibration sensor. In this way, haptic feedback is realized to make the user feel the authenticity of the touch adjustment button while the vehicle seat is controlled and adjusted in the virtual and visual mode.

While the preferred embodiments of the present disclosure have been described, additional alterations and modifications to these embodiments can be made by those skilled in the art once the basic inventive concept is apparent to those skilled in the art. Therefore, it is intended that the appended claims are interpreted as including the preferred embodiments and all alterations and modifications that fall within the scope of the present disclosure.

It will be apparent to those skilled in the art that various modifications and variations can be made to the embodiments of the present disclosure without departing from the spirit and scope of the embodiments of the present disclosure. Thus, if these modifications and variations to the embodiments of the present disclosure fall within the scope of the claims of the present disclosure and their equivalents, it is intended that these modifications and variations also fall within the present disclosure.

What is claimed is:

1. A haptic feedback control method, used for adjusting a vehicle seat and comprising:
   controlling a display screen to display an adjustment information page comprising a touch adjustment button and a three-dimensional, 3D, model of the vehicle seat upon receiving an instruction to display the page on the display screen, wherein the display screen comprises a vibration sensor; and
   receiving a touch instruction, on the touch adjustment button, from a user, adjusting a posture of the vehicle seat through the touch adjustment button, controlling the vibration sensor to perform a haptic feedback at a position of the touch adjustment button, and controlling the display screen to synchronously display a posture of the 3D model of the vehicle seat that is same as a posture of the vehicle seat;
   wherein the touch adjustment button is provided with a strip-like area, and the receiving a touch instruction, on the touch adjustment button, from a user comprises:
   receiving a slide touch operation instruction, in an extension direction of the strip-like area, from the user;
   wherein the haptic feedback control method further comprises:
   adjusting the posture of the vehicle seat at a first speed upon receiving a slide touch operation, along a central position of the strip-like area, from the user; and
   adjusting the posture of the vehicle seat at a second speed upon receiving a slide touch operation, along an edge position of the strip-like area, from the user; wherein the first speed is less than the second speed.

2. The haptic feedback control method according to claim 1, wherein the touch adjustment button comprises at least one of followings: a front-back position adjustment button, an up-down position adjustment button, or a back rest angle adjustment button; and
   the adjusting the posture of the vehicle seat comprises at least one of the following operations: adjusting a front-back position of the vehicle seat, adjusting an up-down position of the vehicle seat, or adjusting a pitch angle of a back rest of the vehicle seat.

3. The haptic feedback control method according to claim 1, wherein the touch adjustment button is provided with a plurality of blocky areas indicating different directions, and the receiving a touch instruction, on the touch adjustment button, from a user comprises: receiving a click touch operation instruction, on the blocky areas, from the user.

4. The haptic feedback control method according to claim 3, wherein the touch adjustment button comprises at least one of followings: a lumbar rest position adjustment button or a head rest position adjustment button; and
   the adjusting a posture of the vehicle seat comprises at least one of followings: adjusting a position of a lumbar rest of the vehicle seat and adjusting a position of a head rest of the vehicle seat.

5. The haptic feedback control method according to claim 1, further comprising: controlling the display screen to display an adjustment information page comprising a main driver button and a passenger button upon receiving an instruction to display the page on the display screen, wherein the main driver button or the passenger button is clicked according to demands of the user to adjust a posture of a main driver seat or a posture of a passenger seat.

6. The haptic feedback control method according to claim 1, further comprising: controlling the display screen to display an adjustment information page comprising a default button upon receiving an instruction to display the page on the display screen; wherein before adjusting the posture of the vehicle seat, the posture of the vehicle seat is adjusted to a factory posture of the vehicle seat automatically upon clicking the default button by the user.

7. The haptic feedback control method according to claim 1, further comprising: controlling the display screen to display an adjustment information page comprising a memory button upon receiving an instruction to display the page on the display screen; wherein after adjusting the posture of the vehicle seat, an adjusted posture of the vehicle seat is stored upon clicking by the user the memory button for a preset duration, so that the vehicle seat is adjusted to the adjusted posture through a one-key click directly in response to the memory button being clicked subsequently.

8. A haptic feedback control device, comprising:
a display screen configured to display an adjustment information page having a three-dimensional, 3D, model of a vehicle seat; and
a processor configured to implement operations comprising:
controlling the display screen to display the adjustment information page comprising a touch adjustment button and the 3D model of the vehicle seat upon receiving an instruction to display the page on the display screen, wherein the display screen comprises a vibration sensor; and
receiving a touch instruction, on the touch adjustment button, from a user, adjusting a posture of the vehicle seat through the touch adjustment button, controlling the vibration sensor to perform a haptic feedback at a position of the touch adjustment button, and controlling the display screen to synchronously display a posture of the 3D model of the vehicle seat that is same as a posture of the vehicle seat;
wherein the adjustment information page displayed on the display screen further comprises touch adjustment buttons, the touch adjustment buttons comprising: a front-back position adjustment button, an up-down position adjustment button, a back rest angle adjustment button, a lumbar rest position adjustment button, and a head rest position adjustment button;
wherein the 3D model of the vehicle seat is positioned in a central area of the adjustment information page, the front-back position adjustment button is arranged in a horizontal direction, the up-down position adjustment button is arranged in a vertical direction, the back rest angle adjustment button comprises a cambered shape, a raised surface of the cambered shape faces away from a back rest, and the front-back position adjustment button, the up-down position adjustment button, the back rest angle adjustment button, the lumbar rest position adjustment button, and the head rest position adjustment button are arranged around the 3D model of the vehicle seat.

9. The haptic feedback control device according to claim 8, wherein the display screen comprises a touch module, a display module, and the vibration sensor, the touch module being arranged on one side of a display surface of the display module, and the vibration sensor being arranged on one side, facing away from the touch module, of the display module.

10. The haptic feedback control device according to claim 9, wherein the vibration sensor comprises piezoelectric devices, the piezoelectric devices being arranged on edges of two sides of the display module, or the plurality of piezoelectric devices distributed in an array being arranged on an entire surface of one side, facing away from the touch module, of the display module.

11. The haptic feedback control device according to claim 8, wherein the adjustment information page displayed on the display screen further comprises a main driver button, a passenger button, a default button, and a memory button.

12. The haptic feedback control device according to claim 11, wherein the main driver button, the passenger button, the default button, and the memory button are positioned at a bottom of the adjustment information page.

13. A non-transitory computer-readable storage medium, storing a computer program, wherein the computer program implements the haptic feedback control method according to claim 1 when executed by a processor.

* * * * *